United States Patent Office 3,428,982
Patented Feb. 25, 1969

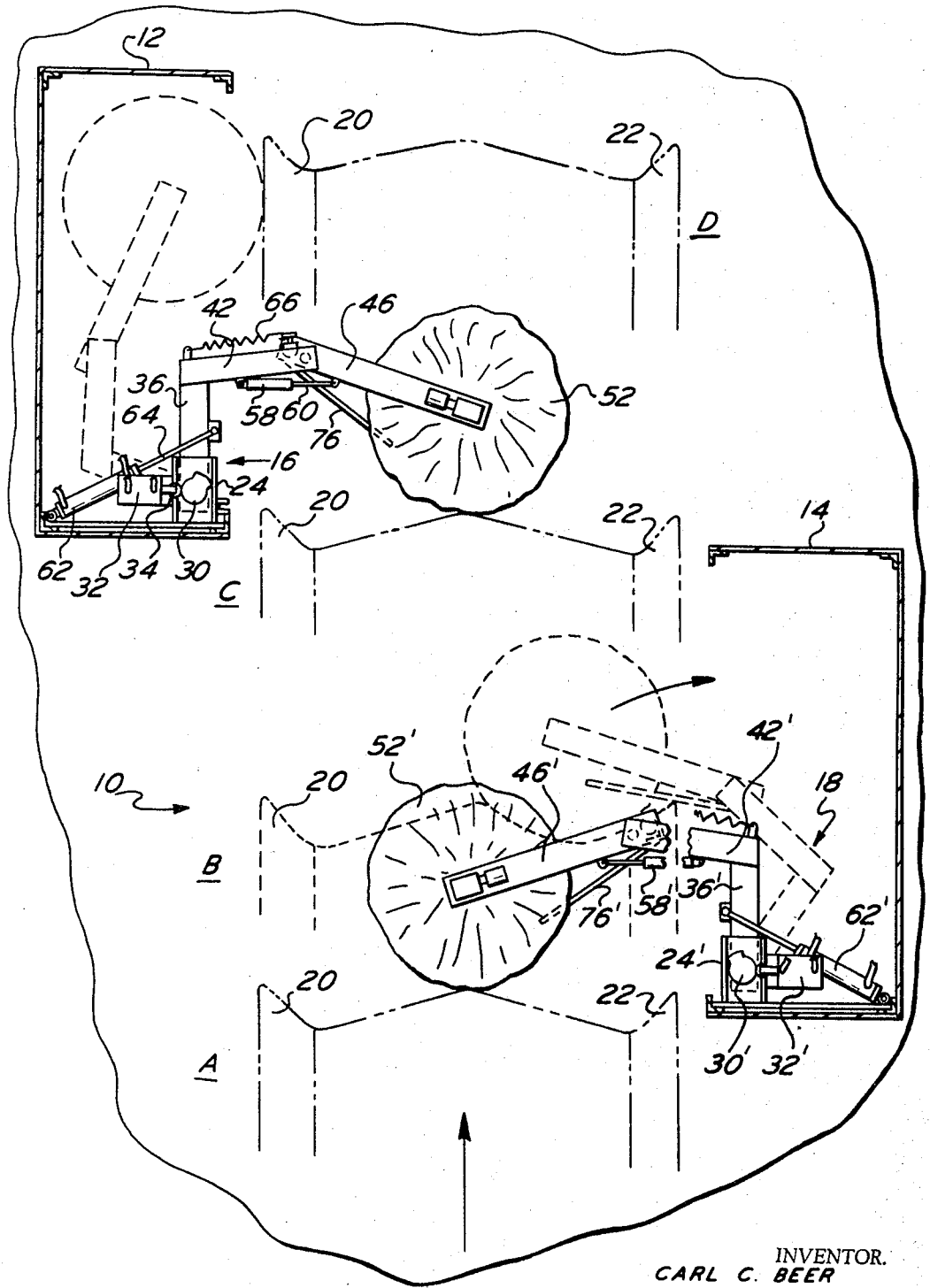

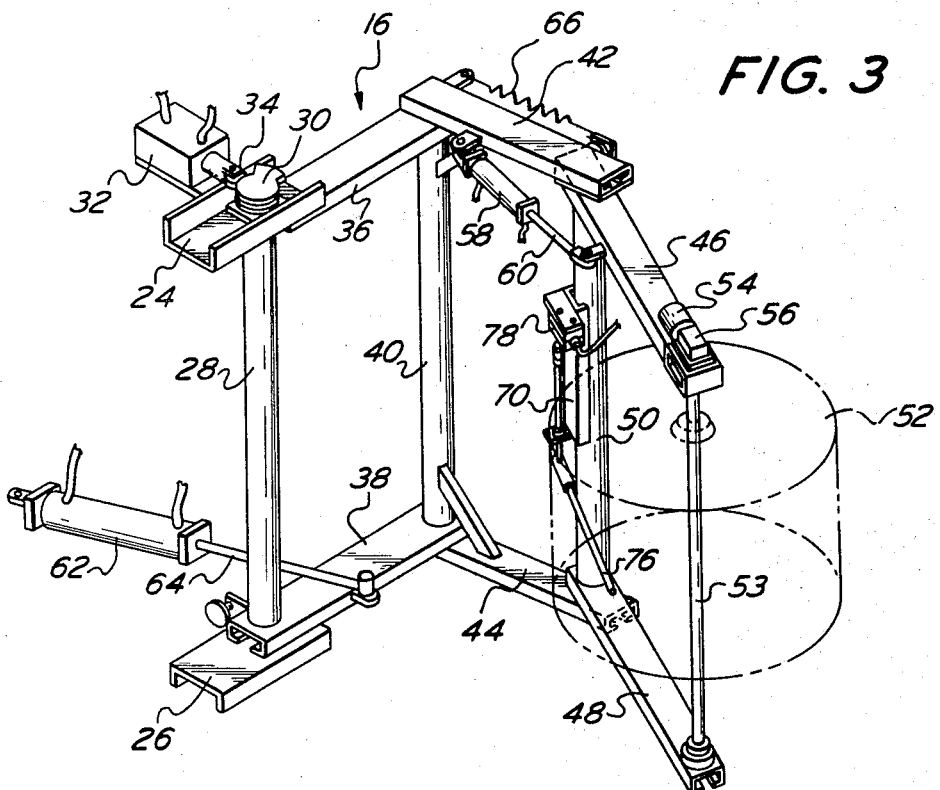

3,428,982
VEHICLE WASHER
Carl C. Beer, Philadelphia, Pa., assignor to Sherman Car Wash Equipment Company, Palmyra, N.J., a corporation of New Jersey
Continuation-in-part of application Ser. No. 544,233, Apr. 21, 1966. This application Dec. 14, 1966, Ser. No. 601,744
U.S. Cl. 15—21                              10 Claims
Int. Cl. A46b *15/00*

ABSTRACT OF THE DISCLOSURE

The problem of brushes forming a part of brush units on a vehicle washer getting hooked on forwardly projecting portions of vehicles passing through the washer is solved by providing a sensing arm on the brush units which causes the brush units when activated to move away from the vehicle.

---

This application is a continuation-in-part of copending application Ser. No. 544,233 filed Apr. 21, 1966 and entitled Vehicle Washer, and now patent No. 3,310,824. The disclosure therein is incorporated by reference.

The present invention relates to vehicle washers of the type wherein vehicles are successively passed through a washer and brush units engage the front, sides and rear of the vheicles, thereby washing the same. In connection with certain models of vehicles, forwardly projecting portions of the fenders or bumpers tend to become hooked to the brush units, thereby tearing off the brush units from their supporting surface. This problem is solved by the present invention.

In accordance with the present invention, brush units are provided in the form which initially contact the front of the vehicle adjacent the center thereof. While being driven by a conveyor or other means, the vehicle pushes the brush out of its way while the brush is rotating. In this manner, the brush moves across one half of the front of the vehicle and washes the same. Certain vehicles have projecting portions which tend to hook onto the brush unit. The present invention provides a sensing arm which causes the brush unit to move away from the vehicle when there is a tendency of the projecting portions becoming hooked onto the brush unit.

It is an object of the present invention to provide means for preventing brush units from becoming hooked onto projecting portions of vehicles as the vehicles are moved through a vehicle washer.

It is another object of the present invention to provide a novel brush unit having a sensing arm extending into the brush and adapted to cause the brush to move away from an object when the object contacts the sensing arm.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a plan view, partly in section, of the vehicle washer in accordance with the present invention.

FIGURE 2 is a perspective view of a sensing means utilized in conjunction with each brushing unit.

FIGURE 3 is a perspective view of one of the brushing units shown in FIGURE 1.

FIGURE 4 is an electrical circuit associated with the sensing means.

Referring to the drawing in detail, wherein like numerals indicate like elements, there is shown in FIGURE 1 a vehicle washer designated generally as 10. The vehicle washer 10 includes first and second housings designated generally as 12 and 14 on opposite sides of a space through which the vehicle to be washed will be moved by a conveyor system which may be conventional and is not shown. Housings 12 and 14 are staggered as illustrated in FIGURE 1. Each of the housings 12 and 14 contain a wrap-around brushing unit, each of which is adapted to wash one-half of the front of the vehicle, one side of the vehicle, and one-half of the rear of the vehicle.

In housing 12, there is provided a wrap-around brushing unit designated generally as 16. In housing 14, there is provided a wrap-around brushing unit designated generally as 18. Each of the units 16 and 18 are identical but of opposite hand. As the vehicle illustrated in phantom progresses sequentially from positions A, B, C and D, the vehicle pushes the brush supported by the units 16 and 18 away from the vehicle. In doing so, the rotating brush of each unit washes one-half of the front of the vehicle. Certain models of vehicles have projecting portions 20 and 22 which tend to become hooked onto the brushing units and tear the brushing units off their support. This is due to the fact that the vehicle is being propelled by a conveyor through the washer 10.

Each of the brushing units 16 and 18 are identical. Hence, only brushing unit 16 will be described in detail and corresponding primed numerals will be provided on brushing unit 18.

Within housing 12, there is provided an upper bracket 24 and a lower bracket 26. See FIGURE 3. A vertically disposed shaft 28 is rotatably supported by the brackets 24 and 26. A cam 30 is provided on the upper end of shaft 28 above bracket 24. A valve 32 is supported by the housing 12. Valve 32 is provided with an actuator terminating in a cam follower 34 associated with cam 30.

An upper arm member 36 and a lower arm member 38 each have one end connected to the shaft 28 for rotation therewith. The other ends of the arm members 36 and 38 are rigidly connected to an upright strut 40. One end of an arm member 42 is connected to said other end of arm member 36. One end of a lower arm member 44 is connected to said other end of arm member 38. This described interconnection between the arm members is a rigid connection. The included angle between the arm members 36 and 42 corresponds to that between arm members 38 and 44, the same being slightly more than 90 degrees.

A strut 50 is rotatably suported by the free ends of arm members 42 and 44 for rotation about its longitudinal axis. An upper arm member 46 and a lower arm member 48 each have one end connected to strut 50 for rotation therewith. The free ends of arm members 46 and 48 rotatably support a vertical brush shaft 53 on which is mounted a brush 52. Brush 52 and its shaft 53 are rotated by a motor 54 connected thereto by way of a gear box 56. Motor 54 and gear box 56 are supported on the upper surface of arm member 46.

Strut 50 and arm members 46 and 48 are selectively caused to pivot about the longitudinal axis of strut 50 by means of a cylinder 58 and piston rod 60. Cylinder 58 has one end pivotably supported by arm member 42. One end of piston rod 60 is connected to a piston within cylinder 58. The other end of piston rod 60 is pivotably connected to arm member 46. The introduction of a motive fluid to cylinder 58 is controlled by valve 32.

The brushing unit 16 is adapted to pivot about the longitudinal axis of shaft 28. This movement is selectively effected by means of cylinder 62 and piston rod 64. One end of the cylinder 62 is pivotably supported by the housing 12. One end of piston rod 64 is connected to a piston within cylinder 62. The other end of piston rod 64 is pivotally connected to the arm member 38.

In the fully extended position of the brushing unit 16, the arm members 42 and 46 have an included angle of approximately 150 degrees. To insure a proper orientation between arm members 42 and 46, a limit stop is provided. The limit stop may assume a wide variety of configurations. In a preferred embodiment, the limit stop includes a spring-biased bumper effective between arm members 42 and 46. A spring means is provided to bias the arm members 42 and 46 to their extended position as illustrated in FIGURE 1. Such spring means includes a spring 66 having one end connected to arm member 46 and its other end connected to arm member 42.

A sensing means designated generally as 68 is supported by strut 50 to prevent the unit 16 from being hooked onto the projecting portion 20 of the vehicle. The sensing means 68 includes a channel 70 removably and adjustably bolted to the strut 50. The channel 70 is provided at its opposite ends with brackets which rotatably support a rod 72 having a flexible coupling 74 between its ends. A sensing arm 76 is adjustably coupled to the rod 72 by a set screw. Sensing arm 76 is preferably made from fibreglass and provided with a rubber coating so as to prevent scratching the vehicle. A microswitch 78 is supported at the upper end of the channel 70 and adapted to be actuated by rotation of rod 72.

As shown more clearly in FIGURE 1, the arm member 46 and sensing arm 76 form an acute angle of approximately 25 degrees. This acute angle is adjustable in the range from about 10 degrees to 30 degrees. When the rod 72 is rotated, it actuates the microswitch 78. The arm 76 can rotate due to such contact, thereby having overtravel while continuing to cause microswitch 78 to remain activated. As shown more clearly in FIGURE 4, actuation of microswitch 78 completes a circuit to a solenoid 80 which controls a valve 82. Valve 82 controls flow of motive fluid into cylinder 62 in a direction so as to rotate the brush unit 16 in a counter-clockwise direction in FIGURE 1. Such rotation of unit 16 causes the same to back away from the moving vehicle. As soon as the unit has backed away from the vehicle so that arm 76 returns to its normal position, continued movement will cease and the unit 16 will await further contact with the vehicle. The circuit illustrated in FIGURE 4 is also preferably provided with a manually operated normally open switch 84 to facilitate testing of the unit and provide a means for selectively retracting the unit whenever desired. In order that the sensing arm 76 will return to its normal position forming an acute angle with respect to arm member 46, a spring bias is provided. The spring bias could be a torsion spring operating between rod 72 and channel 70, or may be a spring effective on the microswitch 78.

The operation of the brushing units 16 and 18 to effect a washing of the front, sides and rear of the vehicle generally travelling at the rate of one foot per second is as follows:

Before the vehicle is caused to move through the space between the brushing unit housings 12 and 14, the brushing units 16 and 18 are in their solidline positions illustrated in FIGURE 1. A washing liquid is sprayed on the vehicle by nozzles, not shown. The brushes 52 and 52' are being rotated about their axes by the motors supported on the arm members 46 and 46'. The brushes 52 and 52' overlap one another but do not interfere since the housings 12 and 14 are staggered with respect to one another. As the vehicle moves to position A, the brush 52' contacts the center front portion of the vehicle. As the vehicle moves to positions B and C, it pushes the brushing unit 18 to the phantom position until the entire unit enters housing 14.

While the vehicle is pushing brushing unit 16 out of the way, the rotating brush 52 washes the front right half of the vehicle. When the vehicle is provided with a projecting portion 22 which would tend to become lodged into the space between the shaft for brush 52' and the strut corresponding to strut 50, the projecting portion will also push against sensing arm 76'. When sensing arm 76' is contacted by the vehicle, switch 78 will close thereby casuing solenoid 80 to activate valve 82. When valve 82 is activated, motive fluid will be introduced into cylinder 62' to cause the entire brushing unit 18' to rotate about the vertical axis of the shaft corresponding to shaft 28, thereby enabling the entire brushing unit to back away from the vehicle.

Up to this point, it is to be noted that the angular relationship between arm members 42 and 46 remains fixed due to the spring bias applied thereto by spring 66. That is, arm member 46' does not pivot about the longitudinal axis of the strut corresponding to strut 50. When the vehicle reaches position C, the brushing unit 18 will be disposed within the housing 14 and in washing contact with the side of the vehicle. When this occurs, cam 30' will have rotated through a sufficient distance so as to activate valve 32'. When valve 32' is actuated, motive fluid is introduced into cylinder 58 to cause the arm member 46' to rotate about the longitudinal axis of the strut corresponding to strut 50, thereby decreasing the included angle between arm members 42' and 46'. Approximately one-half of the side of the vehicle will have been washed by brush 52' when the minimum included angle between arm members 42' and 46' of about 70 to 80 degrees will have been achieved due to actuation of cylinder 58'.

As soon as the vehicle has passed the brush 52', the motive fluid is vented from cylinder 58 and the spring 66 causes the brush 52' to follow the rear of the vehicle. In pivoting the arm member 46' with respect to arm member 42', the spring 66 was stretched and therefore represents a force which is utilized to cause the brush 52' to follow the rear of the vehicle. When the brush 52' has washed the right rear half of the vehicle, it remains in that position as shown in solid lines in FIGURE 1 for contact with the front of the next vehicle. Operation of brushing unit 60 is identical with that described above in connection with unit 18. Each of the units are independently operable and of opposite hand.

The present invention may be embodied in other specific forms without departing from the spirit or essential attributes thereof and, accordingly, reference should be made to the appended claims, rather than to the foregoing specification as indicating the scope of the invention.

It is claimed:

1. In a vehicle washer comprising a brushing unit pivotably mounted for movement about a main axis, said unit including a brush mounted for rotation about an axis parallel to said main axis, said brush being supported by arm members forming part of said unit, and a sensing means supported by the unit, said sensing means at least partially entering the brush, and bias means responsive to actuation of said sensing means for causing the entire unit to pivot about said main axis when contact is made between a portion of the vehicle being washed and said sensing means.

2. In a vehicle washer in accordance with claim 1 wherein said sensing means includes a pivotable sensing arm generally perpendicular to the axis of rotation of said brush, and a switch coupled to the arm for actuation due to pivotation of the sensing arm through an acute angle about an axis generally parallel to said main axis, said switch being connected to control said bias means.

3. In a washer in accordance with claim 2 wherein said sensing arm is a rubber-coated fibreglass cantilever arm.

4. In a vehicle washer wherein a brush unit is pivotable about a main axis, said unit including a pair of arm members coupled together for pivotable movement about an axis intermediate the length of said unit, said intermediate axis being generally parallel to the main axis, one of said arm members being coupled to a brush mounted for rotation about an axis parallel to said axes, selectively operable means coupled to said arm members for selectively pivoting said one arm member and the brush relative to the other arm member, and a sensing means supported by the unit, said sensing means at least partially entering the brush, and bias means responsive to actuation of said sensing means for causing the entire unit to pivot about said main axis due to contact between a portion of a vehicle and said sensing means.

5. In a washer in accordance with claim 4 wherein said sensing means includes a sensing arm generally perpendicular to the axis of rotation of the brush, said sensing arm being mounted for rotation about an axis parallel to the axis of rotation of the brush.

6. In a washer in accordance with claim 5 wherein said arm is a rubber-coated fibreglass cantilever arm.

7. In a vehicle washer comprising brushing unit mounted for pivotable movement between a retracted position where it may engage the side of a vehicle and an extended position where it may engage the front or rear of a vehicle, said unit having two sections pivoted together, support structure for said unit, a brush rotatably supported by one section, means connected to said brush to rotate the brush in collapsed and extended positions of said sections, means coupled between said sections for biasing said one section to its extended position, actuator means connected to said one section for selectively opposing said biasing means and for selectively pivoting said one section relative to the other section, unit moving means connected to said unit for moving said entire unit between its retracted and extended positions relative to said support structure, the improvement comprising a sensing means supported by said unit and partially extending into said brush, said sensing means being connected to said unit moving means to effect actuation of the latter due to contact between a vehicle and said sensing means.

8. In a washer in accordance with claim 7 wherein said sensing means includes a sensing arm lying in a generally horizontal plane and mounted for pivotable movement about an axis parallel to the axis of rotation of said brush, said sensing means including a switch responsive to rotation of said sensing arm through an acute angle.

9. In a washer in accordance with claim 8 wherein said sensing arm is supported by said one section for movement with said one section.

10. In a washer in accordance with claim 8 including means for adjustably positioning the location of said sensing arm with respect to said one section.

References Cited

UNITED STATES PATENTS

| | | |
|---|---|---|
| 3,035,293 | 5/1962 | Larson. |
| 3,251,084 | 5/1966 | Larson et al. |
| 3,271,803 | 9/1966 | Cirino et al. |
| 3,310,824 | 3/1967 | Beer. |

FOREIGN PATENTS

| | | |
|---|---|---|
| 757,722 | 9/1956 | Great Britain. |

EDWARD L. ROBERTS, *Primary Examiner.*